United States Patent
de Perthuis (10) Patent No.: US 10,862,682 B2
(45) Date of Patent: Dec. 8, 2020

(54) NONCE GENERATION FOR ENCRYPTION AND DECRYPTION

(71) Applicant: NXP B.V., Eindhoven (NL)

(72) Inventor: Hugues de Perthuis, Caen (FR)

(73) Assignee: NXP B.V., Eindhoven (NL)

( * ) Notice: Subject to any disclaimer, the term of this patent is extended or adjusted under 35 U.S.C. 154(b) by 726 days.

(21) Appl. No.: 14/804,286

(22) Filed: Jul. 20, 2015

(65) Prior Publication Data

US 2016/0020903 A1    Jan. 21, 2016

(30) Foreign Application Priority Data

Jul. 21, 2014   (EP) .................... 14290211

(51) Int. Cl.
| | | |
|---|---|---|
| *H04L 9/00* | (2006.01) | |
| *H04L 9/30* | (2006.01) | |
| *H04L 9/08* | (2006.01) | |
| *H04L 9/32* | (2006.01) | |
| *H04L 9/06* | (2006.01) | |

(52) U.S. Cl.
CPC .............. *H04L 9/30* (2013.01); *H04L 9/0637* (2013.01); *H04L 9/0822* (2013.01); *H04L 9/3226* (2013.01)

(58) Field of Classification Search
CPC ....... H04L 9/0822; H04L 9/3226; H04L 9/30; H04L 9/0637
USPC .......................................................... 380/44
See application file for complete search history.

(56) References Cited

U.S. PATENT DOCUMENTS

| | | | | |
|---|---|---|---|---|
| 7,797,751 B1* | 9/2010 | Hughes | .................. | G06F 15/16 726/18 |
| 7,814,316 B1* | 10/2010 | Hughes | .................. | G06F 21/72 713/160 |
| 8,341,426 B2 | 12/2012 | Onno et al. | | |
| 8,503,670 B2* | 8/2013 | Leech | .................. | H04L 9/0637 380/28 |

(Continued)

FOREIGN PATENT DOCUMENTS

EP    2 280 365 B1    7/2012

OTHER PUBLICATIONS

Yang, J. et al. "Improving Memory Encryption Performance in Secure Processors", IEEE Transactions on Computers, vol. 54, No. 5, pp. 630-640 (May 2005).

Extended European Search Report for Patent Appln. No. 14290211.3 (dated Jan. 29, 2015).

(Continued)

*Primary Examiner* — Samson B Lemma (57) ABSTRACT

The present disclosure describes methods of encrypting and decrypting blocks of data stored in computer readable memory for a device using a block cipher with a nonce. In particular, methods of encrypting and decrypting blocks of data where the value of the nonce is based on previous execution instructions of a program executed by the device for a previously executed block are described. Embodiments disclosed include a method of encrypting blocks of data bits stored in computer readable memory for a device using a block cipher with a nonce and a key, the method comprising for each block of data: generating a value of the nonce based on previous execution instructions of a program executed by the device for a previously executed block of data; and encrypting the block of data with the nonce and key using the block cipher.

15 Claims, 3 Drawing Sheets

(56) References Cited

U.S. PATENT DOCUMENTS

| | | | |
|---|---|---|---|
| 8,984,268 B2* | 3/2015 | VanHeyningen | H04L 9/0643 380/37 |
| 2010/0299538 A1 | 11/2010 | Miller | |
| 2011/0085657 A1* | 4/2011 | Matthews, Jr. | G06F 12/1408 380/28 |
| 2011/0296201 A1* | 12/2011 | Monclus | G06F 21/53 713/190 |
| 2012/0023337 A1 | 1/2012 | De Perthuis et al. | |
| 2012/0087490 A1* | 4/2012 | Ollikainen | H04L 9/0637 380/28 |
| 2012/0260107 A1 | 10/2012 | Mangard | |
| 2015/0006905 A1* | 1/2015 | Avanzi | H04L 9/0618 713/189 |

OTHER PUBLICATIONS

Dworkin, M. "Recommendation for Block Cipher Modes of Operation: The CCM Mode for Authentication and Confidentiality", Updated 2007, retrieved from the internet at: http://csrc.nist.gov/publications/nistpubs/800-38C/SP800-38C_updated-July20_2007.pdf National Institute of Standards and Technology, U.S. Department of Commerce, 27 pgs (Apr. 2004).

"Block cipher mode of operation", Wikipedia, Internet Archive WayBackMachine, 13 pgs, retrieved from the internet at: http://web.archive.org/web/20131214111147/http://en.wikipedia.org/wiki/Block_cipher_mode_of operatiorn (Dec. 2013).

"Return-oriented programming", Wikipedia, Internet Archive WayBackMachine, 5 pgs, retrieved form the internet at: http://web.archive.org/web/20131110140823/https://en.wikipedia.org/wiki/Return-oriented_programming (Nov. 2013).

* cited by examiner

NONCE GENERATION FOR ENCRYPTION AND DECRYPTION

CROSS-REFERENCE TO RELATED APPLICATIONS

This application claims the priority under 35 U.S.C. § 119 of European patent application no. 14290211.3, filed on Jul. 21, 2014, the contents of which are incorporated by reference herein.

FIELD

The present disclosure describes methods of encrypting and decrypting blocks of data stored in computer readable memory for a microprocessor using a block cipher with a nonce. In particular, methods of encrypting and decrypting blocks of data where the value of the nonce is based on previous execution instructions of a program executed by the microprocessor for a previously encrypted block are described.

BACKGROUND

Many current electronic devices contain a single die Integrated Circuit (IC), where a microcontroller, such as an ARM or 8051 core, controls multiple peripherals such as a serial link, general purpose input/output, etc. The microcontroller data and code are stored in internal computer readable memory, e.g. flash, EEPROM, ROM or RAM.

Some microcontrollers additionally feature a hardware accelerator that is specialized for a particular task such as video encoding or encryption. One example of a hardware accelerator is a memory encryption unit (MEU) that is dedicated to encrypting data stored in the computer readable memory. Such devices may be used in applications where security is important to protect the confidentiality of transactions, for example involving money transfers. Such devices may also be utilized in power meters, credit cards or in other applications where security is an important factor.

To ensure security it is important to ensure that code is kept confidential, to protect against reverse engineering and make hacking more difficult. For this purpose, memory encryption is used. In the examples described above, random access memory is necessary, such that specific modes of encryption are used, typically counter mode or XTS (XOR-encrypt-XOR-based tweaked-codebook mode with ciphertext stealing) mode.

In counter mode, a nonce (an arbitrary number used once) is generated and concatenated to the address of the instruction being fetched, creating a counter value. The same nonce is then concatenated to every address fetched to provide a series of counter values. This provides a series of counter values that are each unique for each address of the instruction and tied to the value of each address. Each counter is then encrypted by a block cipher using a secret key stored in the system. The output of the block cipher is then XORed with the plaintext (the data to be encrypted) to encrypt the plaintext and create a ciphertext (an encrypted version of the plaintext).

In XTS mode, the address is encrypted and used as a tweak for plaintext encryption. The objective in both these modes is that identical instructions at different memory locations results in a different cipher text, effectively protecting the confidentiality of the data and avoiding the ability to cut and paste the ciphertext (the encrypted plaintext) to a different location. Alternative encryption modes where the address of the instruction (the data) is not used, such as electronic codebook (ECB), do not achieve this.

Although memory encryption can protect code confidentiality, it does not protect against execution flow disruption. In execution flow disruption, an attacker tries to skip lines of code, for example code relating to checking that a correct PIN code has been entered, by inserting a fault at the appropriate time in the instruction flow. The attack may take the form of a series of light pulses or a power spike. Alternatively, an attacker could take benefit of a software bug, so that via a buffer overflow a Return Oriented Programming (ROP) attack is executed.

It is an object of the invention to address one or more of the above mentioned problems.

SUMMARY

According to a first aspect of the invention, there is provided a method of encrypting blocks of data stored in a computer readable memory for a device using a block cipher with a nonce and a key, the method comprising for each block of data: generating a value of the nonce based on the previous instructions of a program executed by the device for a previously executed block of data; and encrypting the block of data with the nonce and key using the block cipher.

The method acts to ensure that, when implemented in a system, the program code must be executed in the correct order and/or at the correct state of the device, for example requiring that the integrity of the execution flow is respected. The device may be a microprocessor, in which case the state of the device may be the operating condition of the device (such as boot mode etc.). The system may be a microcontroller comprising a hardware accelerator, such as a memory encryption unit. The previous instructions may be one or more previous instructions, which may have been executed for one or more previous blocks of data.

Instead of using only the information relevant to the block of data being decrypted, prefixed with a static nonce, additional information dependent on the execution flow and/or system status is used. This additional information is used to compute a new nonce. The nonce is therefore non-static between instructions. This ensures that the block cipher is linked to the additional information. Accordingly, the ciphertext can only be correctly decrypted in the case of a correct execution flow and/or system status. As protection can be embedded with the data instead of being applied as a sideband signal, the protection is not a status bit checked by instructions of the program which can be skipped or modified, i.e. the protection is not based on an instruction of the program, but rather the status of the instruction with regard to previous instructions.

For example, for code to be encrypted, the method applies the block cipher to encrypt data bits to be stored in the computer readable memory. This may be achieved using counter mode, XTS mode or any other suitable cryptography mode. For example, for counter mode, instead of generating a counter value using only a unitary nonce and the address of the instruction being encoded for each block of data bits stored in each address, the present method alters the nonce for each block of data bits to be encrypted by using other information, such as the address of the previously executed instructions, so that if the execution flow of a program being executed is not respected (such as with an execution flow disruption attack), a decryption error will occur and processing will stop.

A simple example is where code is executed linearly and encrypted in counter mode. As noted above, for the counter value, a nonce can be used in combination with an address. The counter value is then applied, with a key, using a block cipher to provide the encryption. The nonce may contain information about the current instruction and the previous instruction (current instruction—1). The previous execution instructions may be one or more previous execution instructions. The previous execution instructions may also be expected previous execution instructions based on the current execution instructions. The expected previous execution instructions may be calculated from the current execution instruction, for example by using the expected correct execution flow of instructions between the block of data and the previously executed block of data.

During decryption, which is also linear, the nonce again contains information about the previous instruction and the current instruction in order to decrypt the data. If the code is not executing linearly, then decryption will not be correct as the value of the previously accessed address will not be equal to the (current instruction—1).

Another option can be to use the operation code (opcode) of the previous instruction, or some information about the status of the device. For example, if some part of the code is designated to only be executed at boot time, or in a system mode of the device, this information is configured into the nonce at encryption and therefore during decryption, the system must use this information to compose the counter value. This ensures that that decryption only occurs when the status of the chip has the correct value.

Globally, the code can be encrypted using the counter value, which during decryption, i.e. code execution, can be computed only if the correct flow is followed and/or device is in the correct state.

A counter mode can be used in most examples, but the invention may be applied to other cipher modes where the address of the plaintext to be encrypted is used.

The nonce can have a value that is unique for each block of data bits to be encrypted. This ensures that a unique nonce is needed for every block of data such that, if a single nonce is compromised, only a single block of data can be decrypted.

The step of generating a value of the nonce can include the steps of: obtaining execution instructions of the block; obtaining the previously executed instructions; reading information describing the execution instructions and the previously executed instructions; and embedding the execution instructions and the one or more previously executed instructions as information into the value of the nonce. This ensures that the value of the nonce is tied or linked to the previous execution instructions of the previous block of data bits encrypted. This ensures that the integrity of the execution flow is maintained.

The information can comprise the address of the block of data to be encrypted and the address of the previously encrypted block of data. This ties the value of the nonce used to encrypt the block of data to a previously encrypted block of data. If an address of an incorrect previous block of data is used, decryption will fail because an incorrect value of the nonce will be generated.

The value of the nonce is composed from one or more values indicative of:

i) the type of data bits being encrypted. For example, a bit might be dedicated within the nonce to differentiate between code and data. In this case, the microprocessor, such as a memory encryption unit (MEU) could apply a different nonce based on the Advanced Microcontroller Bus Architecture (AHB) opcode being executed. This will prevent data being executed as code, or code being copied as data;

ii) access rights to the data bits. This may be the access right of the data bits, such as read/write, read only, write only;

iii) a status of the device. This may, for example when the device is a microprocessor, indicate whether the microprocessor is in a boot, test, system or user mode. The microprocessor or MEU can use a bit from a state machine controlling the device, either via software or directly via hardware to determine the status of the device. For example, information on the status can be used to prevent code used during firmware upload or test from being used later in the lifetime of the product;

iv) a register, such as a timer indicating time since boot. Using a register can ensure that bootcode code can be accessed only for a limited duration. When the register reaches a certain value, the resulting bit used for nonce construction will change. This is similar to the status of a microprocessor bit, except it can be based on a time iso state-machine state;

v) a security status of a data bit received from a security block stored in the computer readable memory. For example, when the device contains a microprocessor or MEU, this component could use a status bit received from a security block, e.g. temperature, voltage, random number generator (RNG) readiness to ensure that some part(s) of code can only be executed if one or more or all of the status(es) are correct;

vi) an address of a previous instruction executed by the device. For part of code to be encrypted which is executing linearly, or for instruction which can only be reached from one instruction, this will ensure it is executed in correct order;

vii) a value of an instruction count, indicative of the number and/or type of previous instructions executed by the device. Instead of using the previous address within the nonce construction, a register may be used. The register will count either the number of instructions executed since a specific point, or the number of times part of the code has been executed or a hardware event has occurred;

viii) an operation code of a previous instruction executed by the device. In some cases, part of the code can be reach from multiple locations, e.g. a function. To ensure that this function is not accessed by manipulation of program code or a return address on the stack, it could be checked that the previous instruction is an expected operation code instruction, such as a branch exchange (BX) or branch exchange with link (BLX);

ix) a state of a software state-machine controlled by the device. To ensure that instructions are executed only at some specific stage of the software state-machine, the current stage could be used; and x) a magic number, providing a specific value of the nonce. This is useful for code which can be accessed from multiple locations, e.g. a function set at a specific value that the calling code will have to set properly. The magic number may be a random number provided by a random number generator, or a previously stored random number used for an alternative configuration of the nonce.

The step of providing a block cipher for encrypting data stored in the computer readable memory can further comprise the step of providing the value of the nonce dependent upon a state of the device. This ties the unique value of the nonce to the state of the microprocessor necessary for decryption. An incorrect state (i.e. one that does not match the state during computation of the nonce) of the device during the decryption process will lead to an incorrect value of the nonce, causing decryption to fail.

As noted above, the state of the device dependent for successful encryption can be a boot, test, user or system mode.

In embodiments, the cipher can comprise a counter value indicative of the address of the data bits to be encrypted. This may be employed with an XTS (XOR-encrypt-XOR-based tweaked-codebook mode with ciphertext stealing) encryption mode. In such examples, the step of providing a block cipher for encrypting data stored in the computer readable memory may further comprise the step of modifying the counter value depending upon the state of the microprocessor and/or the flow of execution of a program executed by the microprocessor.

For encrypting the blocks of data the value of the nonce can be combined with the key to provide a cipher, and the cipher used to encrypt the blocks of data.

According to a second aspect of the invention, there is provided a method of decrypting ciphertext blocks of data bits stored in computer readable memory for a microprocessor using a block cipher with a nonce and a key, the method comprising for each block of data:

generating a value of the nonce based on previous execution instructions of a program executed by the microprocessor for a previously decrypted ciphertext block; and decrypting the block of data with the nonce and key using the block cipher.

The nonce may have a value that is unique for each ciphertext block.

The step of generating the value of the nonce can comprise the steps of: obtaining the previous execution instructions of the previously decrypted ciphertext block; obtaining execution instructions of the block of data; and constructing the value of the nonce determined by the previously executed instruction and the execution instructions. This allows the system to decrypt the ciphertext block of data bits by generating a value of the nonce based on the previously executed instruction. Because the previous nonce contained information relating to the previous instruction, this ties the decryption (i.e. generating a correct value for the nonce of the present ciphertext block), with the previously decrypted ciphertext block. This ensures that the integrity of the flow of execution of the ciphertext blocks is maintained.

The previously executed instruction may be obtained by determining the expected previous execution instruction, based on the current execution instructions and optionally also from the flow of execution instructions.

A hint may be obtained, provided by the previous instruction in the execution instructions, wherein the hint provides instructions of how to construct the value of the nonce based on a change in the flow of execution instructions compared to the previous execution instructions. This may include information describing what state the microprocessor needs to be in to successfully construct the nonce to decrypt the ciphertext block.

Furthermore, the value of the nonce may be composed from one or more values indicative of: the type of data bits being encrypted; the access rights to the data bits; the status of the microprocessor; the value of a register, such as a timer indicating time since boot; the security status of a data bit received from a security block stored in the computer readable memory; the address of a previous instruction executed by the microprocessor; the value of an instruction count, indicative of the number and/or type of previous instructions executed by the microprocessor; the operation code of a previous instruction executed by the microprocessor; the stage of an instruction executed by the microprocessor; and a magic number, providing a specific value of the nonce. Each of these values are described in detail with reference to the first aspect.

As noted with respect to the first aspect, this increases the security of the encryption by requiring a unique nonce for each ciphertext block. In such examples, the step of providing a decryption block cipher for decrypting ciphertext blocks may further comprise the step of determining the value of the nonce dependent upon the state of the microprocessor and/or the flow of execution of a program executed by the microprocessor.

The value of the nonce can be determined by the value of the nonce and an increment, said increment being provided by instructions contained within a program executed by the microprocessor. The value of the nonce may also be determined by a hint provided by instructions contained within a program executed by the microprocessor. This allows the microprocessor to be made aware of which nonce to use by using a sideband channel of the memory, e.g. a memory could be dedicated to store which new nonce should be used when an instruction is executing depending on the instruction branch taken during execution of a program by the microprocessor, or via inband signaling by inserting into the code some hints, i.e. a specific instruction like a register write about the next nonce to be used (or to be used after a specific event like a branch). This information may be generated by static analysis during compilation. For instance each time a function is called, just prior to calling, a hint can be used to determine how to configure the value of the nonce to be used, either as an absolute or relative value. Each time a function returns, the correct nonce can be restored, either by a hardware unit, or by a software hint. Additional hints can also be used, e.g. to check that a loop is executed a correct number of times, or to switch from one type of nonce to another type.

In examples, the state of the microprocessor is a boot, test, user or system mode.

Accordingly, an interruption in the flow of the execution instructions results in an unsuccessful decryption of the blocks of data.

According to a third aspect of the invention, there is provided an integrated circuit with a microcontroller, said microcontroller comprising: memory for storing data and code; and a microprocessor for executing code stored in the memory; wherein the microcontroller is configured to undertake the method of the first and/or second aspects.

Accordingly, identical instructions at different memory locations result in different ciphertext, effectively protecting the confidentiality of the data and avoiding the ability to cut and paste the ciphertext to a different location. Encryption modes where the address is not used, such as electronic codebook (ECB), do not achieve this. This block cipher can be reused to perform integrity and authenticity protection by being altered to perform a cryptographic (cipher-based) message authentication algorithm (CMAC, such as CBC-MAC). Each block is XORed with previous results and encrypted with a key. In the present case, the key does not need to be secret, but should not be controlled by the attacker and should be different for every device (so that even if a device is hacked, it will not hack other devices). The key could, for example, be a device identification code (ID).

There may be provided a computer program, which when run on a computer, causes the computer to configure any apparatus, including a circuit, controller, sensor, filter, or device disclosed herein or perform any method disclosed herein. The computer program may be a software implementation, and the computer may be considered as any appropriate hardware, including a digital signal processor, a microcontroller, and an implementation in read only memory (ROM), erasable programmable read only memory (EPROM) or electronically erasable programmable read only memory (EEPROM), as non-limiting examples. The software implementation may be an assembly program.

The computer program may be provided on a computer readable medium, which may be a physical computer readable medium, such as a disc or a memory device, or may be embodied as a transient signal. Such a transient signal may be a network download, including an internet download.

BRIEF DESCRIPTION OF DRAWINGS

The invention is described in further detail in the following by way of exemplary embodiments with reference to the accompanying drawing, in which.

It should be noted that the Figures are diagrammatic and not drawn to scale. Relative dimensions and proportions of parts of these Figures have been shown exaggerated or reduced in size, for the sake of clarity and convenience in the drawings. The same reference signs are generally used to refer to corresponding or similar feature in modified and different embodiments.

DETAILED DESCRIPTION

For encryption, a block cipher is typically employed in many systems, the block cipher being adapted to the width of the memory used to store code. For memory encryption, a block cipher is usually used in a mode compatible with random access and where a different address will give different encryption, such as counter mode or XTS mode.

Figure 1:
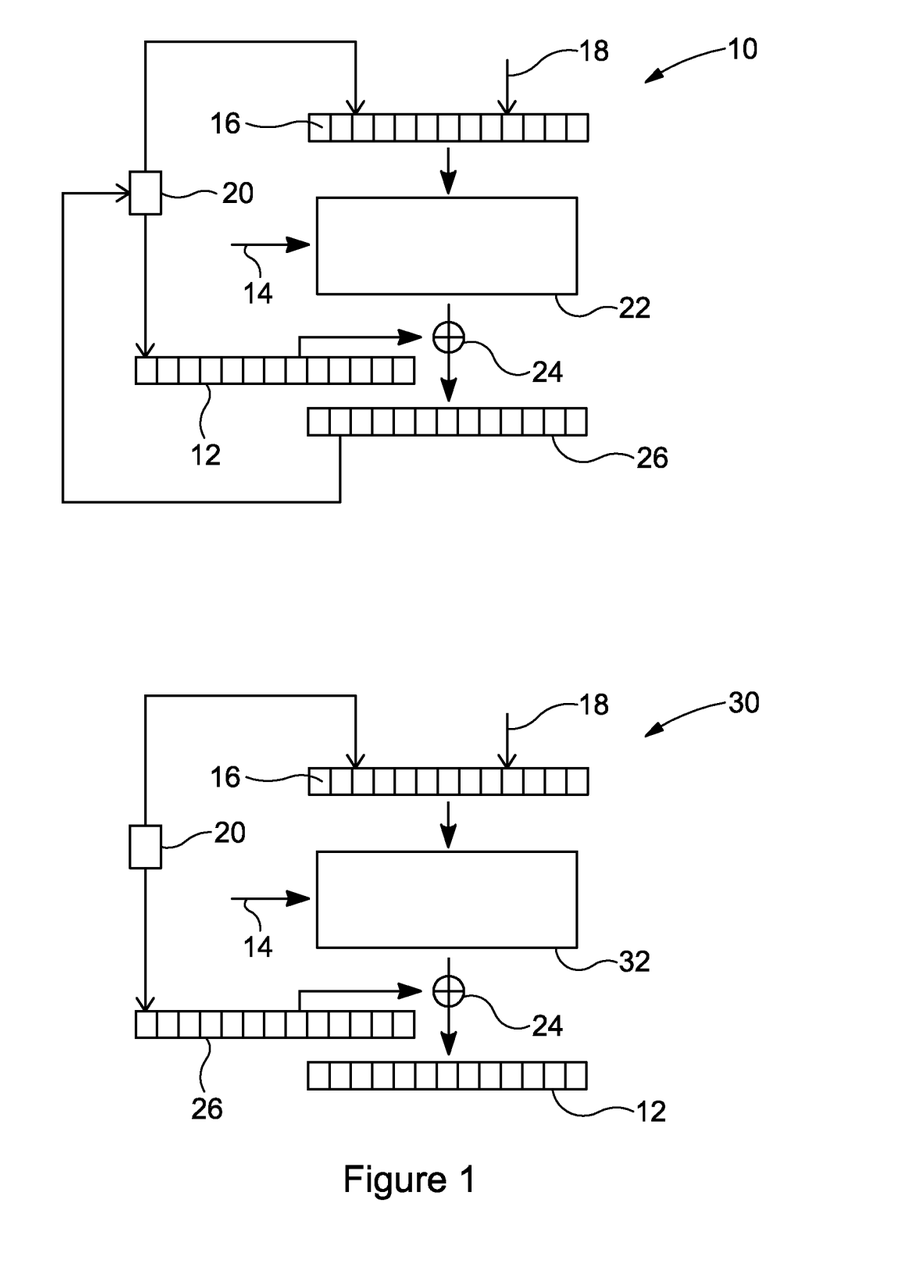
FIG. 1 is a schematic diagram illustrating a known cryptography process.

FIG. 1 shows an example of a known counter mode cryptography process. Encryption 10 and decryption 30 processes are shown. The encryption mode comprises a block of plaintext 12 to be encrypted, a key 14 and a cipher 16. The cipher 16 is generated from a nonce 18 and an address 20 of the plaintext 12. The nonce 18 is an arbitrary number used once, typically a randomly generated number. The cipher 16 and the key 14 are provided to a block cipher 22. The block cipher 22 encrypts the value of the plaintext 12 using XOR 24 to produce an encrypted version of the plaintext 12, known as a ciphertext 26. The ciphertext 26 is then written to the memory in the address 20 of the plaintext 12.

In decryption mode 30, the cipher 16 again comprises the nonce 18 and the address, this time of the ciphertext 26. The cipher 16 is combined with the key 14 in a decryption block cipher 32. The decryption block cipher 32 decrypts the ciphertext 26 using the cipher 16. Provided the correct cipher is used, the plaintext 12 is retrieved.

As noted above, in counter mode the address of the instruction being fetched is encrypted and XORed with the plaintext. In XTS mode, the address to be used is encrypted as a tweak for plaintext electronic codebook (ECB) encryption.

Figure 2:
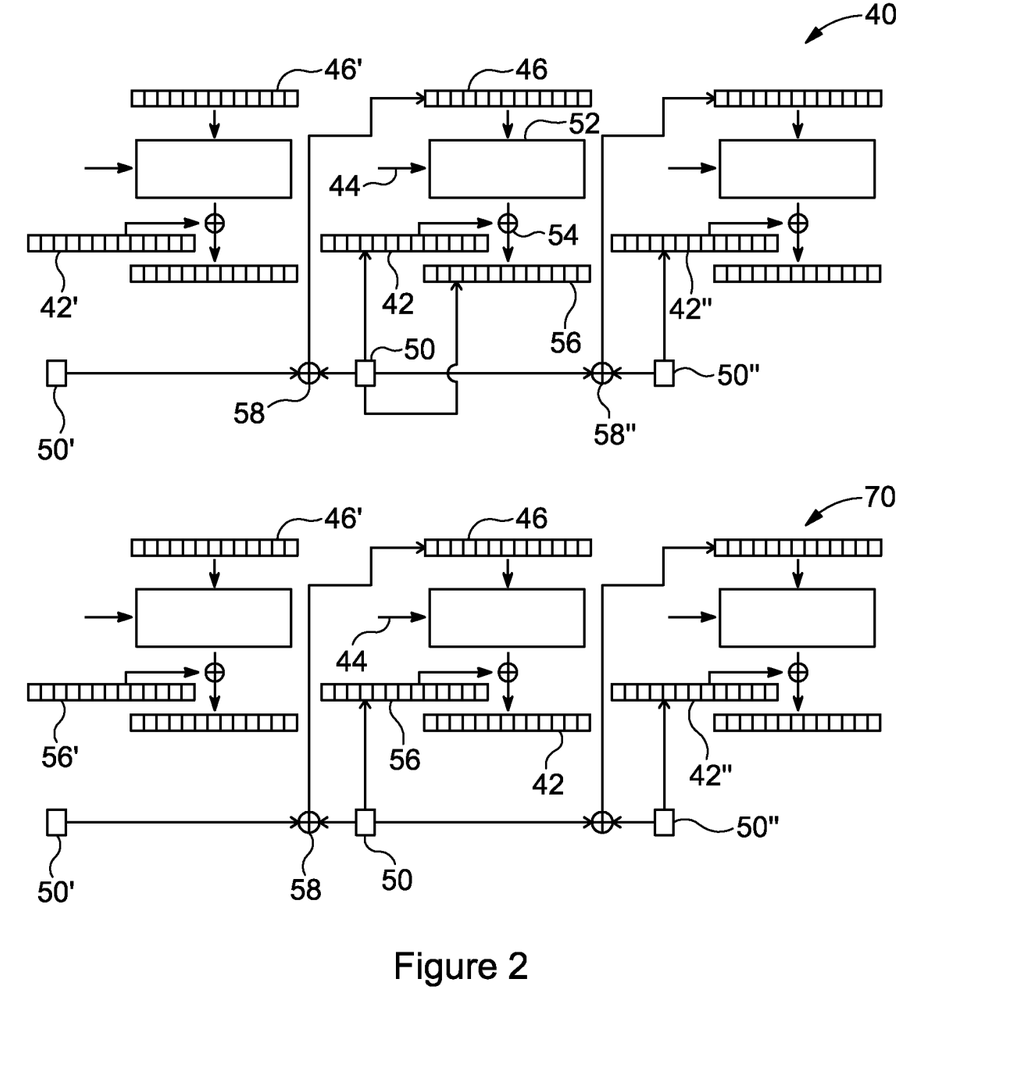
FIG. 2 is a schematic diagram illustrating an exemplary cryptography process.

FIG. 2 illustrates an exemplary cryptography process, showing encryption 40 and decryption 70 modes. In the encryption mode 40, a block of plaintext 42 is encrypted with a block cipher 52 using a key 44 and a cipher or nonce 46.

The nonce 46 comprises information relating to a previous instruction block 50' containing information relating to the previous execution instructions used to encrypt a previous block of plaintext 42', combined with information contained within an instruction block 50 relating to the execution instructions of a program being executed by the microprocessor for the present plaintext 40 and/or the operating status of the microprocessor. In the example shown, this information is combined with information from instruction block 50' relating to the previously encrypted plaintext 42'. The information is combined by an XOR gate 58, to form the value of the nonce 46 for the current encryption cycle.

The nonce 46 and key 44 are provided as inputs to the block cipher 52. The block cipher 52 encrypts the value of the plaintext 42, using an XOR 54 or other known technique to produce an encrypted version of the plaintext 42, known as a ciphertext 56. The ciphertext 56 is then written to the memory, together with information from instruction block 50 describing the present state of the microprocessor and the execution instructions used to encrypt the plaintext 42. The information from instruction block 50 is then relayed to the next block of plaintext 42" to be encrypted and combined with information from instruction block 50" of the execution instructions and/or the state of the microprocessor for the next block of plaintext 42" at XOR gate 58".

Decryption 70 occurs in a similar manner to that described above, but in reverse (assuming a symmetric encryption/decryption process). Information contained in instruction block 50 containing the operating instructions and/or state of the microprocessor of the present ciphertext 56 is combined with information from instruction block 50' containing the operating instructions of the previous ciphertext 56' via XOR 58. This information is used to generate the required value of the nonce 46. Because the correct value of the nonce 46 required for successful decryption is dependent upon the information from the previous instruction block 50', this ensures integrity of the execution flow. If different previous instructions 50' are used, a different value for the nonce 46 will be generated, resulting in a failed decryption (i.e. the incorrect plaintext 42).

As noted above, instead of using only the address of the location being decoded other information is also relied upon, such as the address of the previous instruction, so that if the execution flow of a program is not respected, a decryption error occurs and processing is stopped.

The nonce 46 is composed from a combination of elements, which may include one or more of: the type of data bits being encrypted; the access rights to the data bits; the status of the microprocessor; the value of a counter, such as a timer indicating time since boot; the security status of a data bit received from a security block stored in the computer readable memory; the address of a previous instruction executed by the microprocessor; the value of an instruction count, indicative of the number and/or type of previous instructions executed by the microprocessor; the operation code of a previous instruction executed by the microprocessor; the stage of an instruction executed by the microprocessor; and a magic (randomly generated, either previously stored and called or generated on the fly) number, providing a specific value of the nonce.

For instance, if a block size of 32 bits is used, and an address space of 64 kB is selected, then 14 bits are typically required for the block address, leaving 18 bits left for the nonce.

An example of a Counter value composition (the nonce and the present address of the instruction being executed) is shown in Table 1 below.

TABLE 1

Counter construction

| Bits | Source | Comment |
| --- | --- | --- |
| 31 | Type | Data or Code |
| 30:29 | Device status | Boot, test, user or system mode |
| 28 | Security status | Random Number Generator readiness |
| 27:21 | Magic number | |
| 20:16 | Previous instruction @[7:3] | Previous instruction, only part of previous address used as most jumps are within 256 bytes |
| 15:2 | Instruction | Current instruction |
| 1:0 | Previous instruction @[2:1] | Previous instruction, 16 bits instruction assumed |

Table 1 shows information contained within the value of the counter that is used to encrypt and decrypt a specific block in a block cipher. For example, the nonce comprises bits 0, 1, 16-20, 21-27, 28, 29-30 and 31. These bits contain information identifying the state of the microprocessor and/or the previous instructions, such as in bits 0 and 1. Bits 2 to 15 provide information relating to the current instruction and with the nonce provide the counter value. Bits 16 to 20 provide further information of the previous instruction address that may be used as a hint for decryption. Bits 21 to 27 provide a magic number value and bit 28 a security status, such as the readiness of a random number generator. Bits 29 and 30 contain information of the device status, such as the mode of the device (boot, test, user or system), whilst bit 31 defines the type of information encrypted by the nonce, data or code.

The nonce generated (for counter mode) or address for XTS or other modes based on address is different for each plaintext block encrypted. The use of a nonce or address in a microcontroller is beneficial because the memory space is small so a large number of bits is not used. Moreover, it is not required for the nonce or address to be secret (however the nonce must be unique for each plaintext). Nevertheless, it is also possible to use only part of the secret key. However, this is not advised as it will decrease the entropy; but depending on the key size and security requirements, it is an option.

Different constructions can be used for the nonce, e.g. for some parts of the code, the security status or the current state of a state machine are used. For example, to create a key a random number generator is used, together with temperature and voltage status to ensure that a truly random key or nonce is used, whereas for some others areas of code or plaintext to be encrypted, a different combination of variables can be chosen.

In particular, the microprocessor or a memory encryption unit (MEU) will use different nonces, either based on its own state machine or depending on the configuration information received from the CPU.

Figure 3:
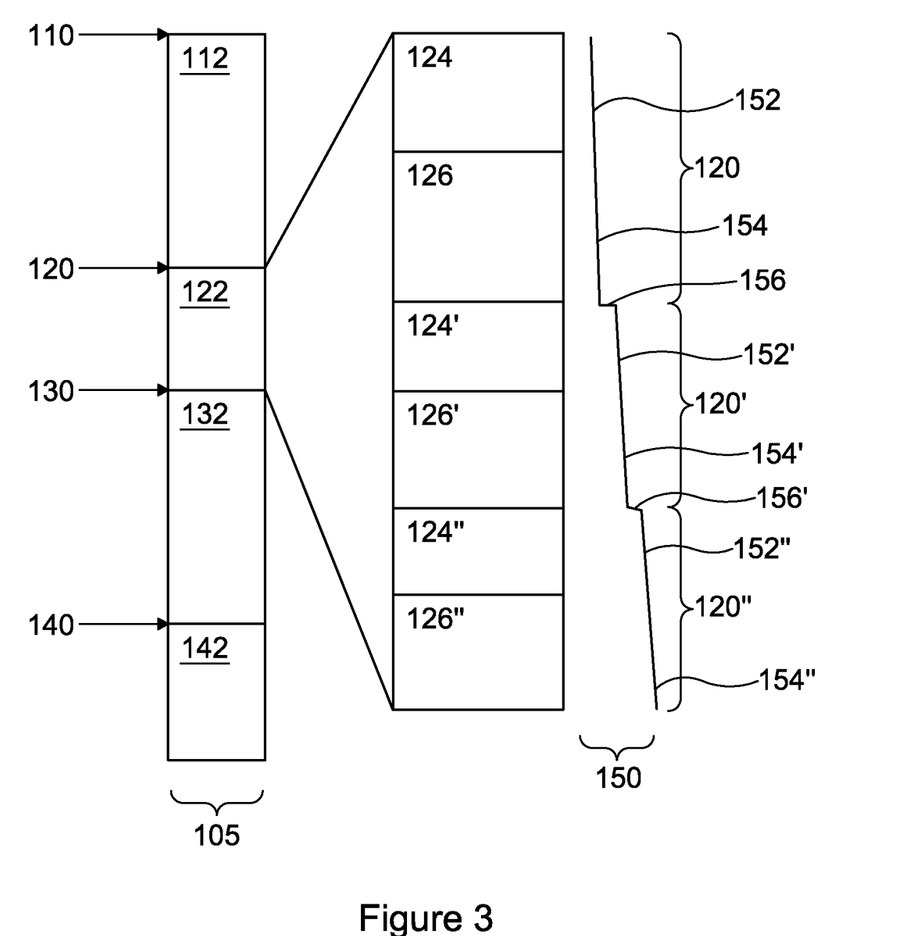
FIG. 3 is a schematic diagram outlining how the value of a nonce changes dependent upon a function executed by a microprocessor in accordance with the encryption mode illustrated in FIG. 2.

FIG. 3 shows an exemplary process 100 of how a nonce may be configured to provide unique values for each block of data according to the present disclosure. In FIG. 3 a program 105 is configured to utilize preset nonces 110, 120, 130, 140 provided according to the requirements outlined in Table 1, such as using a random number generator. The program 105 has a number of functions 112, 122, 132 and 142 that each comprise code containing instructions for execution by a microprocessor. In the example shown, nonce 110 is used to encrypt the plaintext data required or provided for or by program 112, or conversely, is used to decrypt the ciphertext data prior to running of program 112. Similar arrangements are provided between nonce 130 and program 132 and nonce 140 and program 142.

FIG. 3 illustrates a more detailed example of the application of a nonce 120 with a program 122. As described above, the nonce 120 is provided according to a preset series of requirements, such as by a random number generator. This nonce 120 is used to encrypt blocks of plaintext data provided by the program 122. The program may provide instructions detailing how the data or code is to be executed. For example, the code may be executed linearly, looped, require a call to another function or any other known execution.

Once program 122 is called (for example to a microprocessor of a microcontroller), the nonce 120 is also called to the microprocessor. Alternatively, the nonce 120 can be generated on the fly. In the example shown, the first block of instructions of the program 122 contains linear code 124 that provides instructions to execute code linearly, i.e. based on the address of the previous instruction. In this instance, the nonce 120 generated is also configured to increment linearly, so based on the address of the previous instruction. The nonce prefix value 150 is shown in FIG. 3 as a line representative of the value of the nonce 120. As shown, for the linear code 124, the nonce 120 is incremented linearly in portion 152. This ensures that a unique nonce is used to encrypt the plaintext associated with the code executed in this portion of the program. This also ties the integrity of the execution flow of the code to the value of the nonce. Because the nonce generated during encryption is incremented for each block of plaintext, (for example, in linear code 124, the nonce 120 may also be incremented 152 linearly) during decryption the nonce 120 must be generated in the same manner to match the expected linear change in the code 124. Accordingly, the nonce is configured based on the address of the previous instruction, which increments causing the generated nonce to increment. If the code is interrupted or malicious code inserted into the execution flow, the generated incremented value 152 of the nonce will no longer match the required increment indicated by the linear code 124. This will cause decryption to fail.

Further code may also be executed by the program 122. For example, code 126 contains instructions to loop a portion of the code, such as the linear code 124. In this manner, the value of the nonce 120 will continue to increment 154 according to the configuration of the nonce 120. The code 126 also contains a hint that describes how the configuration or construction of nonce 120 needs to change so that any nonce generated matches the nonce value needed for later code. This change may be determined by any of the parameters described above, for example, the state of the system.

In the example shown, the hint provided by the code 126 causes a change 156 in the nonce prefix value, creating a new nonce 120'. Further code, such as linear code 124' can then be executed, causing an incremental change 154' in the generated value of the nonce 120'. Code 126" again provides a hint describing how the configuration of the nonce 120' is required to change to provide the required encryption of blocks of plaintext associated with the program 100. The code 126' in the example shown is a function call, for example calling function 132. The nonce 120' must therefore be generated according to the configuration hint contained within the code 126' to provide the required value 130 for function 132.

The program 105 contains code instructing the system to return to function 122 at block 124". This provides a corresponding change 156' in the prefix value of the nonce 120' to nonce 120". Further linear code 124" and associated generated updates 152", 154" to the nonce 120" can then occur. Finally, the program 105 contains return code 126" instructing the system to return to a different function, such as function 112, together with a hint describing how the configuration of the nonce 120" is required to change to comply with the requirements of the function 112, by being set to the value 110 necessary.

To further describe the process shown in FIG. 3, the process of executing the program 105 with already encrypted data is now described. The data is encrypted using the unique nonce configuration described above.

During decryption, the system 100 executes function 122. In order to correctly execute the blocks of ciphertext data bits called by the function 122, the system 100 calls nonce 120 either from the memory or computes the value of nonce 120 on the fly. As the linear code 124 is executed, the microprocessor generates the value of the nonce 120 according to the configuration of the nonce 120, and the decryption protocol used. For example, if the value of the nonce 120 is tied to the address of the block of ciphertext called, then the microprocessor increments the value of the address stored within the nonce to match the address of the intended block of data. This ensures that the correct nonce is generated to decrypt the encrypted block of data called by the instruction. Again, as noted earlier, a unique nonce is required to decrypt each block of data. In the example shown, the code 124 is linear, so in this case, where the configuration of the nonce is tied to the value of the address, the value of the generated nonce also varies linearly between each of data.

Code 126 contains a hint that, when executed, describes how the configuration of the nonce needs to change to match the needed nonce generated for the next piece of code. For example, the next piece of code may be executed in a different state of the microprocessor. If the state of the microprocessor is configured into the nonce, then the nonce used during decryption needs to be configured to operate in the same state. In other words, the microcontroller may be configured to read the current state of the microprocessor and apply this state using the configuration to generate the required value of the nonce. Any data encrypted using the generated nonce, would then be linked to the state of the microprocessor during encryption. If the nonce performed encryption during a firmware update state of a microprocessor, then, provided the same configuration of nonce is used for decryption, successful decryption would also require the microprocessor to be in a firmware update state. This can cause a change in the nonce prefix value 150 as shown in FIG. 3, leading to a jump 156 in the value of the nonce 120 to 120'.

In the example described, the nonce is built with a prefix and the current address. Generally, this arrangement is utilized, where instructions can be executed only from a previous instruction. The prefix will therefore be the address of the previous instructions, so the prefix will increase linearly. For each function 112, 122, 132, 142, a new random nonce 110, 120, 130, 140 is used. Accordingly, when a function, e.g. 132 wants to call a subfunction, e.g. 126, a correct hint is required so that the nonce 120 of the called function can be generated (if no protection is required, e.g. for performance, than the nonce 120 will be the value of the address in the memory).

Within a function 112, 122, 132, random jumps in the nonce also occur, i.e. at nonce 156 from nonce 120 to nonce 120' and at 156' from nonce 120' to nonce 120" values. For example, during a loop instruction 154, a hint is used so that when the loop is finished, the nonce 120 of the first instruction 124 reaches the correct value 152' only if the loop has been executed the correct number of times. If some iterations of the loop have not been executed, then the generated nonce 120' will return an incorrect value and a decryption error will occur.

For a function call, such as at 126' a hint is again present in code, so that the nonce 120' used for the called function, e.g. 132 can be correctly computed if the required nonce 130 is correctly generated or called. Just before return to the function code 126', the called function 130 will have a hint instruction, so that the correct nonce 120" of the following code 124" after the function call 126' can be generated. As noted above, these hints are useful for functions which can be called only by specific parts of the code.

From reading the present disclosure, other variations and modifications will be apparent to the skilled person. Such variations and modifications may involve equivalent and other features which are already known in the art of cryptography and which may be used instead of, or in addition to, features already described herein.

Although the appended claims are directed to particular combinations of features, it should be understood that the scope of the disclosure of the present invention also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable subcombination. The applicant hereby gives notice that new claims may be formulated to such features and/or combinations of such features during the prosecution of the present application or of any further application derived therefrom.

For the sake of completeness it is also stated that the term "comprising" does not exclude other elements or steps, the term "a" or "an" does not exclude a plurality, a single processor or other unit may fulfil the functions of several means recited in the claims and reference signs in the claims shall not be construed as limiting the scope of the claims.

The invention claimed is:

1. A method of encrypting blocks of data bits stored in a computer readable memory for a device using a block cipher with a nonce and a key, the method comprising for each block of data:

generating a value of the nonce based on previous execution instructions of a program executed by the device for a previously executed block of data, wherein integrity of execution flow is tied to the generated value of the nonce such that a decryption error will occur and stop processing after an execution flow disruption attack and the generated value of the nonce depends upon an address of a previous instruction executed by the device; and encrypting the block of data with the nonce and the key using the block cipher.

2. The method according to claim 1, wherein the value of the nonce is unique for each block of data.

3. The method according to claim 1, wherein the step of generating the value of the nonce further comprises:
   obtaining current execution instructions of the block of data;
   obtaining or determining the previous execution instructions;
   reading information describing the current execution instructions and the previous execution instructions; and
   embedding the current execution instructions and the previous execution instructions as information into the value of the nonce.

4. The method according to claim 3, wherein the information comprises an address of the block of data to be encrypted and an address of the previously executed block of data.

5. The method according to claim 3, wherein the information comprises one or more of a type of data being encrypted; access rights relating to the data; a status of the device at the time of encryption; a register value indicating a time-iso state of the device; a security status of a data bit received from a security block stored in the computer readable memory at the time of encryption; a value of an instruction count, indicative of the number and/or type of previous instructions executed by the device; an operation code of a previous instruction executed by the device; a stage of an instruction executed by the device; and a magic number, providing a specific value of the nonce.

6. The method according to claim 1, wherein the value of the nonce is dependent upon an operating state of the device.

7. The method according to claim 6, wherein the operating state of the device is a boot, test, user or system mode.

8. The method according to claim 1, wherein the step of encrypting the block of data further comprises:
   combining the value of the nonce with the key to provide a cipher; and
   encrypting the block of data using the cipher.

9. A method of decrypting ciphertext blocks of data stored in a computer readable memory for a device using a block cipher with a nonce and a key, the method comprising for each block of data:
   generating a value of the nonce based on previous execution instructions of a program executed by the device for a previously executed ciphertext block, wherein integrity of execution flow is tied to the value of the generated nonce such that a decryption error will occur and stop processing after an execution flow disruption attack and the generated value of the nonce depends upon an address of a previous instruction executed by the device; and
   decrypting the block of data with the nonce and key using the block cipher.

10. The method according to claim 9, wherein the value of the nonce is unique for each ciphertext block.

11. The method according to claim 9, wherein the step of generating the value of the nonce further comprises:
   obtaining or determining the previous execution instructions of the previously decrypted ciphertext block;
   obtaining current execution instructions of the block of data; and
   constructing the value of the nonce determined by the previous instructions and the current execution instructions.

12. The method according to claim 11, wherein the step of determining the value of the nonce further comprises:
   obtaining a hint provided by the previous instruction in the execution instructions, wherein the hint provides instructions of how to construct the value of the nonce based on a change in the execution flow compared to the previous execution instructions.

13. The method according to claim 9, wherein the value of the nonce is composed from one or more values indicative of: a type of data being decrypted; access rights relating to the data; a status of the microprocessor; a value of a register indicating a time-iso state of the microprocessor a security status of a data bit received from a security block stored in the computer readable memory; a value of an instruction count, indicative of the number and/or type of previous instructions executed by the microprocessor; an operation code of a previous instruction executed by the microprocessor; a stage of an instruction executed by the microprocessor; and a magic number, providing a specific value of the nonce.

14. An integrated circuit with a microcontroller, said microcontroller comprising:
   the computer readable memory configured to store data and code; and
   a microprocessor configured to execute code stored in the computer readable memory, wherein the microcontroller is configured to undertake the method as described in claim 1.

15. An integrated circuit with a microcontroller, said microcontroller comprising:
   the computer readable memory configured to store data and code; and
   a microprocessor configured to execute code stored in the computer readable memory, wherein the microcontroller is configured to undertake the method as described in claim 9.

* * * * *